United States Patent Office 3,427,187
Patented Feb. 11, 1969

3,427,187
SILICIC-HYDROCARBON COMPOSITES
John Bentley Wiggill, Wilmington, Del., assignor to E. I. du Pont de Nemours and Company, Wilmington, Del., a corporation of Delaware
No Drawing. Continuation-in-part of application Ser. No. 363,973, Apr. 30, 1964. This application June 22, 1964, Ser. No. 377,064
U.S. Cl. 117—118     2 Claims
Int. Cl. C03c 17/30; C08g 31/18

ABSTRACT OF THE DISCLOSURE

Copolymers containing pendant silane groups prepared by the reaction of an acyl halide containing copolymer and an amino silane or an alcohol silane, bonded to a silicic substrate.

---

This application is a continuation-in-part of application Ser. No. 363,973, filed Apr. 30, 1964, now abandoned.

This invention relates to silicic substrates that are chemically bonded to polymeric materials.

Various attempts have been made in the past to increase the service life of glass structures by coating techniques, but until the present invention, no structures were available in which a high molecular weight polymer could be directly bonded to the silicic base.

In order to produce a silicic substrate with a chemically bonded polymeric coating, it is necessary that the polymeric coating material contain hydrolyzable silane radicals. The preferred process for preparing such polymeric coating materials is by polymerizing an alpha-beta-ethylenically unsaturated carboxylic acid with at least one other alpha-beta-ethylenically unsaturated monomer, then reacting the carboxylic acid units of the thus formed copolymer with a halogenating agent whereby some of the acid —OH groups are replaced with halogen atoms, and then reacting the acid halide copolymer with an amino silane or an alcohol silane.

Polymeric materials useful as coatings for the silicic substrates of the present invention are copolymers of at least two different alpha-beta-ethylenically unsaturated monomers that have been modified by reaction with a silane containing molecule. One of the alpha-beta-ethylenically unsaturated monomers must be a carboxylic acid, the other monomer or monomers are not critical. The concentration of the carboxylic acid units in the copolymer should be between 0.2 and 25 mol percent, preferably 1 to 10 percent. Representative carboxylic acid monomers are acrylic, methacrylic, ethacrylic, itaconic, maleic, fumaric, mono esters of dicarboxylic acid such as ethyl hydrogen fumarate and maleic anhydride. Maleic anhydride and other alpha-beta-ethylenically unsaturated anhydrides are considered acids for the purposes of the present invention. Representative other monomers that may be used in the copolymer are styrene, acrylonitrile, methyl methacrylate, vinyl acetate, vinyl chloride, ethylene, vinylidene chloride, isobutylene, chloroprene, butadiene and the like. One of the preferred classes of other monomers may be represented by the formula

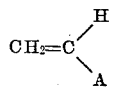

where A is hydrogen or a hydrocarbon radical having 1 to 8 carbon atoms.

The acid copolymer need not be a two component polymer. Thus, more than one alpha-beta-ethylenically unsaturated carboxylic acid can be employed in the polymer, and also more than one other alpha-beta-ethylenically unsaturated monomer may be employed. In a preferred copolymer at least one of the other alpha-beta-ethylenically unsaturated monomers has the formula

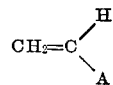

as above defined, and is present in the copolymer to the extent of at least 50 mol percent, and at least one of the other alpha-beta-ethylenically unsaturated monomers is selected from the class consisting of alkyl acrylates and methacrylates having up to eight carbon atoms, vinyl acetate, vinyl propionate, methyl methacrylate, and ethyl acrylate and is present in the copolymer to the extent of 0.1 to 25 mol percent.

Specific copolymers useful as starting materials include the following:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylenestyrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylenevinylidene chloride/acrylic acid copolymers, ethylene/vinyl fluoride/methacrylic acid copolymers, ethylene/chlorotrifluoroethylene/methacrylic acid copolymers, ethylene/methacrylic acid/acrylic acid copolymers, and ethylene/methacrylic acid/maleic anhydride copolymers. It is thus apparent that the base copolymers all contain radicals having the formula

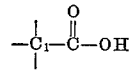

where $C_1$ is a carbon atom in the main copolymer chain.

The copolymers containing the carboxylic acid are converted to acid halide copolymers by treating with a suitable halogenating agent. Such agents include carbonyl chloride, thionyl chloride, phosphorus trichloride, and phosphorus pentachloride, and the equivalent bromine and iodine compounds. The halogen substitution step is usually carried out in an organic solvent for the copolymer, preferably a halogenated solvent. The solvent should be liquid under reaction conditions, and contain between 1 and 12 carbon atoms. Suitable solvents include carbon tetrachloride, perchloroethylene, trichloroethylene, toluene, benzene, and xylene. The reaction may also be carried out in the absence of a solvent using solid polymer and thionyl chloride vapor as the halogenating agent. A more complete description of processes for producing such copolymers is contained in Ser. No. 254,567, filed Jan. 29, 1963. Preferably, substantially all of the acid groups are converted to acid halide groups.

The conversion of the copolymers and alpha-beta-ethylenically unsaturated acid halide units to silane containing copolymers is preferably carried out by dissolving the acid halide in a suitable solvent and adding the silane compound to the solution. Suitable solvents include hydrocarbon solvents and chlorinated hydrocarbon solvents such as benzene, toluene, xylene, hexane, cyclohexane, carbontetrachloride, tetrachloroethylene, trichloroethylene, and the like. The silane compound appears to react substantially stoichiometrically with the halide atoms of the copolymer. Thus, the amount of conversion of halide to the silane derivative can be regulated by merely regulating the amount of silane compound added. The conversion is usually carried out at a temperature between 25 and 200° C.; the temperature is not critical.

In general, it is desirable to have a sufficient number of silane radicals present in the copolymer to crosslink the copolymer and form a network. A network could be accomplished with as few as two silane radicals per copolymer molecule. Stated in terms of mol percent, the number of silane radicals necessary to form a network is about 0.1 percent based on the copolymer. The silane radicals can be present in amounts of up to 25 mol percent based on the mols to copolymer radicals. Preferably, the mol percent silane is about 1–10 percent.

The silanes employed to react with the acid halide groups have the formula: Y—Q—T—Z, where Y is selected from the class consisting of radicals having the formula —OH and —NHR; Q is a divalent radical having 1 to 22 carbon atoms that is bonded through a carbon atom to both T and Y. Q is preferably a divalent hydrocarbon containing radical such as an aromatic, aliphatic, cyclic, or heterocyclic radical. Q may be substituted with one or more groups selected from the class consisting of esters, ethers, tertiary amines, amides, ketones, aldehydes, nitriles, and halides. Q may also be substituted with one or more siloxane radicals having the formula

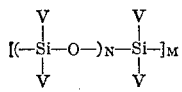

where N is 1 to 28 and M is 1, provided the siloxane radical is bonded to the remainder of the Q radical through carbon atoms, T is a silicon containing radical selected from the class consisting of

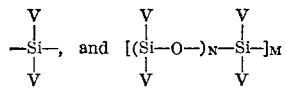

where N is 0 to 28 and M is 1. Z is a radical selected from the class consisting of —OR and —SR, R is a radical selected from the class consisting of hydrogen and hydrocarbon containing radicals containing 1 to 22 carbon atoms. Thus, R may be aromatic, aliphatic, cyclic, or heterocyclic, and may be substituted with one or more groups selected from the class consisting of esters, ethers, tertiary amines, amides, ketones, aldehydes, nitriles, halides and silicon containing radicals; V is selected from the class consisting of R and Z.

A simple silane molecule useful in the reaction with the acid halide group is

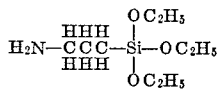

in other words, the case where Y is —$NH_2$, where Q is propyl, T is

and V is the same as Z and Z is ethoxy.

It can thus be seen that the only critical features in the silane molecule are that it contains an alcoholic radical or an amine radical, a radical on a silicon atom that is hydrolyzable, and that the alcoholic radical or amine radical and the group containing the silicon atom having the hydrolyzable radical be bonded through a carbon atom to a divalent radical having 1 to 22 carbon atoms. The other variants that may be present in the radicals of the silane molecule are not critical.

The reaction between the acid halide containing copolymer and the silane molecule is illustrated by means of the following chemical equation:

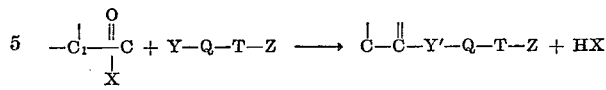

where $C_1$ is a carbon atom in the main polymer chain, X is halide, Y' is —O— or

and Y, Q, T, Z and R are as defined above.

It will be noted that the Z radical of the formula set forth above for the silane compound is a radical that is readily hydrolyzable. It is through the hydrolyzable radicals that the polymer is bonded to the silicic substrate. These hydrolyzable radicals are hydrolyzed when contacted with silicic substrates and the polymer condenses to form

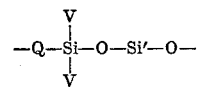

linkages, where Si' is a silicon atom of the silicic surface. Silicic surfaces normally absorb water from air, but even dried silicic surfaces cause reaction to take place. The hydrolyzable radicals also hydrolyze and condense among themselves in the presence of water to form

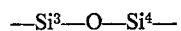

crosslinks where $Si^3$ and $Si^4$ are silicon atoms in different T radicals. The crosslinked coating on the base gives a high degree of abrasion resistance to normally relatively easily marred silicic base.

The bonding of the copolymer to the silicic base and the crosslinking reaction are very rapid, for the acid by-product of the reaction accelerates the reaction.

The silane modified copolymer may be applied to the silicic substrate by painting or spraying a solution of the copolymer on the substrate or by dipping the substrate in the solution. The copolymer may also be applied as a melt. Other coating techniques may also be employed.

An alternative method of producing the coated substrates of the present invention is to treat the silicic substrate with a silane of the formulas previously described, and then treat the substrate with a carboxylic acid halide polymer solution. The acid halide reacts with the Y group to produce the chemical bond. This alternative process does not produce a Si—O—Si crosslinked copolymer surface.

Since the silicic base is chemically bonded to the copolymer, the copolymer may be applied between silicic surfaces and used on an adhesive or cohesive for bonding the silicic surfaces together.

Many different types of silicic surfaces are known that can be used as the substrate of this invention. Glasses, clays, cements, and felspars are examples of useful silicic surfaces.

In the following examples which illustrate the invention, all parts and percentages are in parts by weight unless otherwise specified.

Example 1

Ethylene-methacrylic acid copolymer, whose composition was 78.4 weight percent ethylene units and 11.4 weight percent methacrylic acid units, having a melt index of 4.9 g./10 min., was completely converted to the acid chloride derivative using phosphorus pentachloride. An infrared scan of a film pressed from the ethylene-methacrylyl chloride polymer had a peak at 5.6 microns due to the acid chloride carbonyl and no peaks at 3.0, 6.1 and 6.6 microns.

Two grams of this ethylene-methacrylyl chloride polymer were dissolved in 100 cc. of carbon tetrachloride with heating and stirring at 60° C. When the polymer was completely in solution, 5.3 cc. of a solution of gamma-aminopropyl-triethoxy-silane (made from 1 cc. of gamma-aminopropyl-triethoxy-silane and 9 cc. of carbon tetrachloride) were added to react with the polymer. A film of the purified product was examined under infrared which confirmed the product to be ethylene methacrylamidopropyltriethoxysilane polymer. The spectrum showed amide peaks at 3.0, 6.1 and 6.6 microns.

Two glass panes were coated at their edges with this solution, and pressed on opposite sides of a polyethylene gasket. The sealed entity was an insulated window pane with a space between the parallel glass sheets.

Example 2

Fifteen grams of an ethylene-methacrylyl bromide polymer, which had been made from an ethylene-methacrylic acid copolymer of 82.6 weight percent ethylene units and 17.4 weight percent methacrylic acid units, having a melt index of 42.5 g./10 min., were dissolved with heating and stirring in 100 cc. of carbon tetrachloride at about 60° C. Six cc. of gamma-aminopropyltriethoxysilane were added to react with the polymer solution.

Glass microscope slides were flamed to clean their surfaces and then dipped in the product solution to give them a coating of the product. When heated in an air oven at 300° C. for 15 minutes, a slide showed some scorching but an equivalent sample coated with polyethylene charred under the same treatment. This illustrates the improved heat stability of this material over polyethylene.

Example 3

Ethylene-methacrylyl chloride polymer, made from ethylene-methacrylic acid copolymer whose composition was 88.4 weight percent ethylene units and 11.6 weight percent methacrylic acid units, having a melt index of 4.9 g./10 min., was used as the starting point. An infrared scan of a film of this resin showed a peak due to the acid chloride carbonyl at 5.6 microns but no peaks at 3.0, 6.1 or 6.6 micron.

Six grams of this polymer were dissolved in 100 cc. of carbon tetrachloride with heating and stirring. 14.1 cc. of a solution of 3 cc. of delta-aminobutylmethyldiethoxysilane in 27 cc. of carbon tetrachloride were added to react with the polymer solution. An infrared scan of a film cast from the product solution showed that reaction had taken place. This was evident from a decrease in the size of the acid chloride carbonyl peak and the appearance of peaks at 3.0, 6.1 and 6.6 microns due to the amide formed.

Glass beads having a diameter of 0.08 inch were coated with this copolymer solution, and then forced into a mold the shape of a plate. The solvent was evaporated and a solid plate was produced.

Example 4

Ethylene-acrylic acid copolymer of about 6 weight percent acrylic acid having a melt index of 15 g./10 min. was converted to the acid chloride derivative. An infrared scan of a film of this material showed a peak at 5.6 microns caused by the acid chloride carbonyl; no peaks appeared at 3.0, 6.1 or 6.6 microns.

One gram of the ethylene-acrylyl chloride polymer was dissolved in 200 cc. of tetrachloroethylene with heating and stirring. 1.5 cc. of a solution of gamma-aminopropyltriethoxysilane, made from 1 cc. of gamma-aminopropyltriethoxysilane and 9 cc. of tetrachloroethylene, were added to the polymer solution to react with it. An infrared scan of a film cast from the product showed that reaction had taken place as the 5.6 micron peak of the acid chloride carbonyl had decreased in size while amide peaks appeared at 3.0, 6.1 and 6.6 microns.

When glass microscope slides with an uncontaminated surface were dipped in the product solution, it was then possible to melt bond polyethylene to the primed surface. 180° peel strengths of these bonded coatings went as high as 20 lb./in.

Example 5

Ten grams of ethylene-fumaric acid copolymer of about 3.6 weight percent fumaric acid having a melt index of 200 g./10 min., were dissolved in 300 cc. of tetrachloroethylene at 70° C. 1.75 grams of phosphorus pentachloride were added to the solution which was kept stirred and heated at 70° C. for over four hours. The polymer product was precipitated from the solution with the addition of dry acetone. The precipitate was then filtered, washed with acetone and dried in a vacuum oven under a nitrogen bleed at room temperature. An infrared scan of a film pressed from the product showed it to be the acid chloride derivative of the original polymer as shown by the acid chloride carbonyl peak at 5.6 microns while there were no peaks at 3.0, 6.1 or 6.6 microns.

One gram of this acid chloride polymer was dissolved in 100 cc. of carbon tetrachloride with heating and stirring. 1.1 cc. of a solution made from 1 cc. of gamma-aminopropyltriethoxysilane in 9 cc. of carbon tetrachloride was added to the acid chloride polymer solution to react with it. An infrared scan of a film cast from this solution showed that reaction had taken place, as evidenced by a reduction in the size of the acid carbonyl peak at 5.6 microns and by the presence of amide peaks at 3.0, 6.1 and 6.6 microns.

When a series of clean glass slides with uncontaminated surfaces were primed with this final product solution, they were found to be capable of adhering to polyethylene when it was melted on them.

Example 6

Twelve grams of styrene-methacrylic acid copolymer, whose composition was 90 weight percent styrene units and 10 weight percent methacrylic acid units, were placed in 350 cc. of tetrachloroethylene with 10 grams of phosphorus pentachloride. The mixture was heated and stirred to give a product solution after four and a half hours. The product was precipitated with dry methanol to give a gummy precipitate which hardened gradually. An infrared scan of a film of this product showed that reaction had taken place as could be seen from a strong adsorption at 5.6 microns due to the acid chloride carbonyl.

Two grams of the acid chloride polymer were dissolved in 100 cc. of carbon tetrachloride with heat and stirring in less than half an hour. Five cc. of a solution made from 1 cc. of gamma-aminopropyltriethoxysilane and 9 cc. of carbon tetrachloride were added to react with the acid chloride polymer solution. An infrared scan cast from the final product solution showed that reaction had taken place as could be seen by the decrease in adsorption at the acid carbonyl peak at 5.6 microns and by the appearance of amide peaks at 3.0, 6.1 and 6.6 microns.

When an uncontaminated glass slide was primed with the final product solution, it was capable of adhesion to polystyrene when the polymer was melted on to the slide. When a cast film of this material was exposed to atmospheric moisture for a period, it was not able to be pressed with heat due to a degree of cross-linking which developed.

Example 7

The grams of a copolymer made by grafting methacrylic acid on to polypropylene having a melt index of 1 g./10 min. were placed in 300 cc. of tetrachloroethylene with 20 grams of phosphorus pentachloride and reacted with heating and stirring for over thirteen hours to give a product in solution. The product was precipitated by the addition of dry acetone, filtered, washed with dry acetone and dried under vacuum at room temperature. An infrared scan of a film pressed from the product showed that reaction had taken place to give the acid chloride derivative. This was shown by an acid chloride carbonyl peak which appeared at 5.6 microns.

Two grams of the acid chloride polymer were dissolved in 100 cc. of carbon tetrachloride with heating and stirring just below the solvent reflux temperature in less than two hours. 2.3 cc. of a solution made from 1 cc. of gamma-aminopropyltriethoxysilane and 9 cc. of carbon tetrachloride were added to react with the acid chloride polymer solution. An infrared scan of a film cast from the final product solution showed reaction had taken place by the appearance of amide absorption bands at 3.0, 6.0, and 6.65 microns.

A cast film of the final product which had been exposed for a time to atmospheric moisture showed its intractability, caused by crosslinking which had taken place, when it showed little flow when heated at 200° C. and pressed at 40,000 lbs. for two minutes. A similarly exposed piece of cast film of the final product showed this crosslinking when it was found to be no longer completely soluble, despite a 7 hour extraction in a jacketed soxhlet with refluxing carbon tetrachloride.

Two glass panes were coated on one surface with the solution of reaction product of acid chloride polymer and gamma-aminopropyltriethoxysilane, and then bonded to opposite surfaces of a transparent polyolefin film comprising ethylenemethacrylic acid copolymer whose acid groups had been partially ionically crosslinked with sodium ions. The product was an inexpensive safety glass window which did not shatter when broken.

Example 8

Ten grams of an ethylene-itaconic acid copolymer containing about 6 weight percent itaconic acid units having a melt index of 100 g./10 min., were dissolved in 350 cc. of tetrachloroethylene with heating and stirring in approximately half an hour. Ten grams of phosphorus pentachloride were then added to react with the polymer in solution. After four hours, the reaction product was precipitated with dry acetone, filtered, washed with dry acetone and dried under vacuum at room temperature. An infrared scan of a film pressed from this product showed that reaction had taken place as was evidenced by an acid chloride carbonyl peak at 5.6 microns. There were no peaks at 3.0, 6.1 or 6.6 microns.

Two grams of the acid chloride polymer were dissolved with heating and stirring in 100 cc. of carbon tetrachloride. 2.8 cc. of a solution made from 1 cc. of gamma-aminopropyltriethoxysilane and 9 cc. of carbon tetrachloride were added to react with the acid chloride polymer solution. An infrared scan of a cast film of this final product showed reaction had taken place by the decrease in the acid chloride carbonyl peak at 5.6 microns and by the appearance of amide peaks at 3.0, 6.1 and 6.6 microns.

When a cast film of this final product had been exposed to the atmosphere, it crosslinked and showed little flow when pressed at 40,000 lbs. for 2 minutes at 200° C. between 8 inch square platens. Seven hours extraction of a similarly exposed film of the final product with refluxing carbon tetrachloride in a jacketed soxhlet, showed the material to be 94 weight percent insoluble as a result of the crosslinking despite the fact that prior to crosslinking the material was completely soluble.

Glass tumblers were sprayed with the solution of the reaction product of the acid chloride polymer and the silane. The surface of the tumbler was scratch and mar-resistant and was shiny.

Example 9

Ten grams of ethylene-maleic acid copolymer containing approximately 3 weight percent maleic acid units having a melt index of 100 g./10 min., were dissolved in 350 cc. of tetrachloroethylene with heating and stirring in less than half an hour. Eight grams of phosphorus pentachloride were then added to react witht he solution which was kept heated and stirred. After five hours, the product was precipitated from solution by the addition of dry acetone, filtered and washed with dry acetone. The precipitated polymer product was dried under vacuum at room temperature. An infrared scan of a film pressed from the product showed that reaction had taken place to produce the acid chloride polymer as evidenced by the appearance of an acid chloride carbonyl absorption peak at 5.6 microns. There were no peaks at 6.1 or 6.6 microns.

Two grams of the acid chloride polymer were dissolved in 100 cc. of carbon tetrachloride with heating and stirring. Three cc. of a solution made from 1 cc. of gamma-aminopropyltriethoxysilane in 9 cc. of carbon tetrachloride were added to react with the acid chloride polymer solution.

Glass jars were coated by the process of Example 8, with the same result.

Example 10

Ten grams of a polymer made by grafting 4 grams methacrylic acid onto 20 grams linear polyethylene having a melt index of 2 g./10 min., were heated and stirred in 350 cc. of tetrachloroethylene for 1½ hours. Twenty grams of phosphorus pentachloride were then added to the mixture and allowed to react with heating and stirring for five hours. The product which was in solution was precipitated by the addition of dry acetone, filtered, washed with dry acetone and then vacuum dried at room temperature. An infrared scan run on a film pressed from the product showed by the appearance of an acid chloride carbonyl peak at 5.6 microns that reaction had taken place to give the acid chloride polymer.

Two grams of the acid chloride polymer were dissolved in 100 cc. of carbon tetrachloride with heating and stirring. 8.2 cc. of a solution made from 1 cc. of gamma-aminopropyltriethoxysilane in 9 cc. of carbontetrachloride were added to react with the acid chloride polymer solution.

Glass fiber was sprayed with this solution and then used as a reinforcement for polyethylene molded plaques.

Example 11

Three grams of ethylene-vinyl acetate-methacrylyl chloride polymer which had been made from ethylene-vinyl acetate-methacrylic acid terpolymer having a melt index of 27.2 g./10 min., whose composition was 22.9 weight percent vinyl acetate units, 7.7 weight percent methacrylic units and the remainder ethylene units, were dissolved in 200 cc. of carbon tetrachloride with heating and stirring. 5.5 cc. of a solution made from 1 cc. of gamma-aminopropyltriethoxysilane in 9 cc. of carbon tetrachloride were added to react with the acid chloride polymer. An infrared scan of a film cast from the product solution showed reaction had taken place as could be seen by the appearance of amide peaks at 3.0, 6.05 and 6.55 microns.

A brick building wall was painted with the solution. The wall was moisture-resistant and the coating was permanent.

Example 12

Twelve grams of ethylene-ethyl acrylate-acrylic acid terpolymer, having a melt index of 40 g./10 min. whose approximate composition was 84 weight percent ethylene units, 10 weight percent ethyl acrylate units and 6 weight percent acrylic acid units, were dissolved in 350 cc. of tetrachloroethylene with heating and stirring. 7.5 grams of phosphorus pentachloride were added to react with the polymer solution. After three hours, the product was precipitated by adding dry acetone, filtered, washed with dry acetone and then dried under vacuum at room temperature. An infrared scan run on a film pressed from the product showed that a reaction had taken place as was shown by an acid chloride carbonyl peak at 5.6 microns. No peaks were evident at 3.0, 6.1 and 6.6 microns.

Two grams of the acid chloride polymer were dissolved with heating and stirring in 100 cc. of carbon tetrachloride in less than half an hour. 2.9 cc. of a solution made from 1 cc. of gamma-aminopropyltriethoxysilane in 9 cc. of carbon tetrachloride were added to react with the acid chloride polymer solution. An infrared scan of a film cast from the final polymer product solution had amide peaks at 3.0, 6.1 and 6.6 microns showing that reaction had taken place.

A cast film of this final polymer product, after having been exposed to atmospheric moisture, showed its crosslinking by not being amenable to pressing at 180° C. between 8 inch platens at 40,000 lbs. for two minutes. A similarly exposed piece of cast film became 96 weight percent insoluble in refluxing carbon tetrachloride in a jacketed soxhlet over a 7 hour period showing the crosslinking, since it had been originally completely soluble.

The copolymer solution was sprayed on the internal surface of a concrete tank. After treatment, this tank had improved resistance to chemical attack.

Example 13

Ten grams of ethylene-neohexene-methacrylic acid terpolymer having a melt index of 1110 g./10 min., which contained approximately 6.9 weight percent methacrylic acid units were dissolved with heating and stirring in 350 cc. of tetrachloroethylene in about half an hour. Seven grams of phosphorus pentachloride were added and allowed to react with the polymer solution while continuing to heat and stir the mixture. After four and a half hours, the product was precipitated from solution by adding dry acetone, filtered, washed with dry acetone and then dried under vacuum at room temperature. An infrared scan of a film pressed from the product had an acid chloride carbonyl peak at 5.6 microns which showed that reaction had taken place.

Two grams of the acid chloride polymer were dissolved in 100 cc. of carbon tetrachloride with heating and stirring. 3.2 cc. of a solution made from 1 cc. of gamma-aminopropyltriethoxysilane in 9 cc. of carbon tetrachloride were added to react with the acid chloride polymer solution.

The polymer solution was then sprayed on the external surface of a soft drink bottle. The bottle was mar-resistant and shiny.

Example 14

Fifteen grams of ethylene-vinyl acetate-methyl hydrogen maleate terpolymer, having a melt index of 105 g./10 min., whose composition was approximately 53 weight percent ethylene units, 46 weight percent vinyl acetate units and 1 weight percent methyl hydrogen maleate units, were dissolved with heating and stirring in 350 cc. of tetrachloroethylene in twenty minutes. Five grams of phosphorus pentachloride were added to react with the polymer solution while the heating and stirring were continued. After 5 hours, the product was precipitated with dry methanol, filtered, washed with dry methanol and then dried under vacuum at room temperature.

Two grams of the acid chloride polymer product were dissolved in 100 cc. of carbon tetrachloride with heating and stirring. 0.5 cc. of a solution made from 1 cc. of gamma-aminopropyltriethoxysilane and 9 cc. of carbon tetrachloride was added to react with the acid chloride polymer solution.

The resulting solution was used to coat a set of laboratory safety glasses. The lenses were clear and mar-resistant.

Example 15

Two grams of ethylene-methacrylyl fluoride polymer, which had been made from an ethylene-methacrylic acid copolymer having a melt index of 42.5 g./10 min., containing 17.4 weight percent of methacrylic acid units, was dissolved in 200 cc. of carbon tetrachloride with heating and stirring. When the polymer was in solution, 1.4 grams of gamma-aminopropyltriphenoxysilane were added to react with the polymer.

An infrared scan of the product showed reaction had taken place as evidenced by the amide absorption peaks.

The product solution was used to coat the surface of glass cook-wear. The cook-wear was mar-resistant and withstood temperatures of 150° C. without noticeable change.

Example 16

Two grams of ethylene-methacrylyl chloride polymer, which had been made from ethylene-methacrylic acid copolymer having a melt index of 4.9 g./10 min. which contained 11.6 weight percent methacrylic acid units, was dissolved in 200 cc. of tetrachloroethylene with heating and stirring. When the polymer was in solution, 0.687 gram of p-aminophenyltriethoxysilane were added to react with the polymer in solution.

When glass was primed with this product, it bonded well to polyethylene which was melted on to it.

Example 17

Two grams of ethylene-methacrylyl chloride polymer, which had been made from ethylene-methacrylic acid copolymer having a melt index of 4.9 g./10 min. which contained 11.6 weight percent methacrylic acid units, was dissolved in 200 cc. tetrachloroethylene with heating and stirring. When the polymer was in solution, 0.72 gram of phenylaminomethyl-(methyl)-diisopropoxysilane was added to react and thus to give the product in solution.

This solution was then employed in the process of Example 7 with substantially the same results.

Example 18

Two grams of ethylene-methacrylyl chloride polymer, which had been made from ethylene-methacrylic acid copolymer having a melt index of 42.5 g./10 min. which contained 11.6 weight percent methacrylic acid units, was dissolved with stirring in 200 cc. tetrachloroethylene at 60° C. When the polymer was in solution, 0.74 cc. of isopropoxy-tert-butoxyaminosilane was added to react with the polymer in solution to give the product.

The solution product was then coated on the glass barrel of a screw feeder. The coating provided lubricity for the metal screw against the barrel and the coating was mar-resistant.

Example 19

Two grams of ethylene-methacrylyl chloride polymer, made from an ethylene-methacrylic acid copolymer having a melt index of 580 g./10 min., containing 5.0 weight percent methacrylic acid units, were dissolved in 200 cc. of carbon tetrachloride with heating and stirring at 60° C. polymer in solution was reacted with 0.49 gram of di-(4-hydroxymethylphenyl)-diphenoxysilane which was mixed in with it. A glass tumbler was dipped in this solution and a highly crosslinked coating was formed.

Example 20

Two grams of ethylene-methacrylyl chloride copolymer made from ethylene-methacrylic acid copolymer having a melt index of 42.5 g./10 min., containing 17.4 weight percent methacrylic acid units, were dissolved in 200 cc. of carbon tetrachloride with heating and stirring at 60° C. When the polymer was in solution, 1.15 grams of 2-hydroxyphenylmethylideneaminopropylmethyldiethoxysilane, a dark yellow-brown liquid, were added to react with the polymer. The product was applied to the surface of a flask by dipping the flask in the solution. A highly crosslinked coating was formed.

Example 21

Two grams of ethylene-methacrylyl chloride copolymer made from ethylene-methacrylic copolymer having a melt index of 42.5 g./10 min., containing 17.4 weight percent methacrylic acid units, were dissolved in 100 cc. of toluene with heating and stirring at 60° C. When the polymer was in solution, 1.23 grams of methyl-N-[(2-methyl-5-thienyl) - methyl]aminopropylmethyldiethoxysilane were added to react with the polymer. Glass was primed with this product and polyethylene was bonded to it by melting the polyethylene.

Example 22

Two grams of ethylene-methacrylyl chloride polymer, made from ethylene-methacrylic acid copolymer having a melt index of 42.5 g./10 min., containing 17.4 weight percent methacrylic acid units, were dissolved in 200 cc. of toluene with heating and stirring. When the polymer was in solution, 1.36 grams of gamma-(6-2-carbethoxyethyl)-aminopropyltriethoxysilane were added slowly to react with the polymer in the hot solution. This solution was used to coat the external surface of a soft drink bottle. The bottle was mar-resistant and shiny.

Example 23

Two grams of ethylene-methacrylyl chloride polymer, made from ethylene-methacrylic acid copolymer having a melt index of 42.5 g./10 min., containing 17.4 weight percent methacrylic acid units, were dissolved in 200 cc. of carbon tetrachloride with heating and stirring. When the polymer was in solution, 1.0 gram of delta-(N-2-cyanoethyl)aminobutylmethyldiethoxysilane was added slowly to react with the polymer in solution. This solution was sprayed on to a glass mirror and yielded a smooth uniform coating.

Example 24

Two grams of ethylene-methacrylyl chloride polymer, made from ethylene-methacrylic acid copolymer having a melt index of 42.5/g.10 min., containing 17.4 weight percent methacrylic acid units, were dissolved in 200 cc. of perchloroethylene with heating an dstirring. When the polymer was in solution, 1.91 grams of gamma-aminopropylheptaethoxytrisiloxane were added slowly to the stirred solution which was at approximately 100° C. This solution was applied to glass fiber cloth by dipping the cloth in the solution. A highly crosslinked coating was obtained.

Example 25

Three grams of ethylene-methacrylyl chloride polymer, made from ethylene-methacrylic acid copolymer having a melt index of 580 g./10 min., containing 5.0 weight percent methacrylic acid units, were dissolved in 200 cc. of perchloroethylene wtih heating and stirring near the boiling point of the solvent. When the polymer was in solution, 0.79 g. of 2-hydroxyphenylmethylideneaminopropylpentaethoxydisiloxane was added slowly to react with the polymer in solution. This solution wa spoured over glass beads and the solvent evaporated. The glass beads were securely bonded together.

Example 26

Three grams of ethylene-methacrylyl chloride polymer, made from ethylene-methacrylic acid copolymer having a melt index of 580 g./10 min., which contained 5.0 weight percent methacrylic acid units, were dissolved in 200 cc. of perchloroethylene with stirring at a temperature just below the boiling point of the solvent. When the polymer was in solution, 0.855 gram of 2,4-dihydroxybenzophenone - 4 - sulfoamidopropyltriethoxysilane was added to the solution to react with the polymer. Two glass panes were coated in the manner described in Example 7, and the results were substantially the same.

Example 27

Two grams of ethylene methacrylyl chloride polymer, made from ethylene methacrylic acid copolymer having a melt index of 42.5 g./10 min., containing 17.4 weight percent methacrylic acid units were dissolved in tetrachloroethylene with heating and stirring. When the polymer was in solution, 0.36 gram of tertiary butylaminoethylmethacrylate was added to react with a portion of the acyl chloride groups. When the reaction had taken place, 0.46 cc. of gamma-aminopropyltriethoxysilane were added to the remaining acyl chloride groups.

In frared scans of films cast from the solution prior to adding the gamma-aminopropyltriethoxysilane showed that reaction had taken place by the appearance of an amide carbonyl peak at $6.1\mu$. Infrared scans taken from films cast after the gamma-aminopropyltriethoxysilane showed that reaction had taken place by the appearance of amide peaks at 3.0, 6.1 and $6.6\mu$. The solution was applied by spraying to a glass tumbler. A highly crosslinked mar-resistant coating was formed on the tumbler.

Example 28

Nineteen grams of ethylene methacrylyl chloride polymer, made from ethylene methacrylic acid copolymer having a melt index of 42.5 g./10 min., containing 17.4 weight percent methacrylic acid units were dissolved in tetrachloroethylene with heating and stirring When the polymer was in solution, 1.6 cc. of methacrylic acid were added to react with a portion of the acyl chloride groups. When the reaction had taken place, 4.4 cc. of gamma-aminopropyltriethoxysilane were added to remaining acyl chloride groups.

Infrared scans of films cast from the solution prior to adding the gamma - aminopropyltriethoxysilane showed that reaction had taken place by the appearance of an anhydride peak at $5.75\mu$. Infrared scans taken from films cast after the gamma-aminopropyltriethoxysilane showed that reaction had taken place by the appearance of amide peaks at 3.0, 6.1 and $6.6\mu$. The solution was applied to a portland cement wall by spraying. The resulting coating was waterproof.

Example 29

Two grams of ethylene-methacrylyl chloride polymer, made from ethylene-methacrylic acid copolymer having a melt index of 42.5 g./10 min., which contained 17.4 weight percent methacrylic acid units, were dissolved in 200 cc. of toluene with heating and stirring. When the polymer was in solution, 1.66 grams of bis(triethoxysilylpropyl)amine were added to react with the polymer. The solution was applied to a ceramic bird bath to yield a high crosslinked, weather-resistant coating.

Example 30

Two grams of ethylene-methacrylyl chloride polymer described in Example 1 were reacted with 0.53 cc. of gamma-aminopropyltriethoxysilane and used to coat woven glass tape by priming the tape with a solution containing 5.0 gram of polymer per 100 cc. of perchloroethylene. The glass-polymer composite so formed was then used as reinforcement in a polyethylene pipe.

Example 31

The polymer product of Example 30 was coated on the ceramic insulator of a spark plug, reacting and crosslinking on the surface to form a composite. This composite had a hydrophobic surface.

Example 32

The polymer product of Example 30 was coated on and reacted with the surface of the rear window of an automobile to form a composite structure. This surface resisted the adhesion of ice to it, making it more easily cleaned.

Example 33

The process of Examples 1 to 32 can be repeated to obtain substantially analogous results using the following base polymers as a starting point: tetrafluoroethylene/isobutylene/acrylic acid whose composition was 1:1:0.1 on a mole basis, whose melt index was 5.2 and whose stick point was 126° C.; ethylene/methyl methacrylate/methacrylic acid whose composition was 80:15:5 on a weight basis; methyl methacrylate/methacrylic acid polymer whose composition was 82:18 on a weight basis; butadiene/styrene/methacrylic acid polymer whose composition was about 44:53:3 on a weight basis; vinylidene chloride/acrylonitrile/itaconic acid polymer whose composition was about 91.2:8.5:0.3 on a weight basis (this material was soluble in 65% tetrahydrofuran and 35% toluene); methyl vinyl ether/maleic anhydride whose composition was 1:1 on a mole basis and which was soluble in pyridine; a chlorosulfonated polyethylene containing 33.7 weight percent chlorine and 5% sulfur; chlorinated ethylene/methacrylic acid polymer which was made by chlorinating ethylene-methacrylic acid copolymer of a 91:9 composition to give a 17% chlorine content. The polymer contained 1.01 milliequivalents of carboxyls per gram of polymer.

Example 34

Two grams of ethylene-methacrylyl chloride polymer which contained 20.4 weight percent methacrylyl chloride were reacted with 0.46 cc. of gamma aminopropyltriethoxysilane and this material was coated on a flamed glass sheet then had a sheet of "Mylar" polyester sheet placed on it which in turn had been coated with ethylene-methacrylyl chloride polymer. The laminate was heated in a press at 210° C. at low press and the whole assembly of the laminate was fused into one structure.

The process of any of the Examples 1 to 34 can be repeated with substantially the same results using silane compounds having the following formulas:

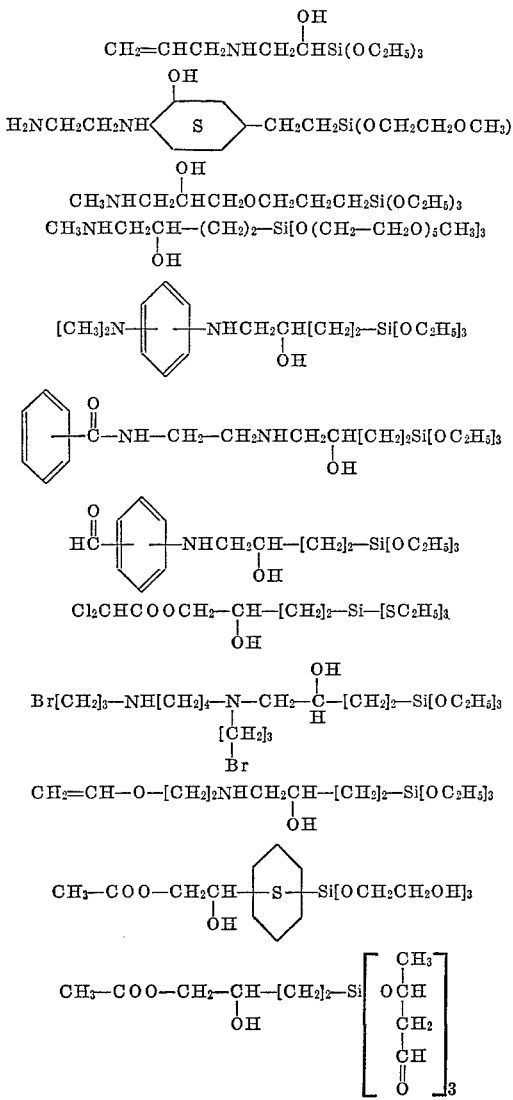

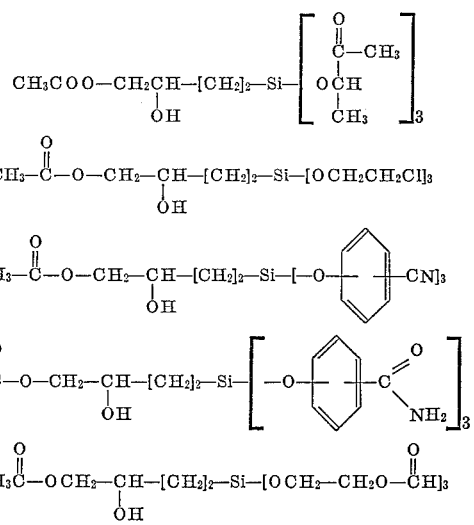

I claim:
1. A composite comprising a silicic substrate chemically bonded to a copolymer comprised of at least 50 mol percent polymerized alpha-olefin units selected from the class consisting of ethylene and propylene, and at least 0.1 mol percent polymerized units containing the radical

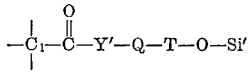

where $C_1$ is a carbon atom in the main copolymer chain, Y' is a radical selected from the class consisting of

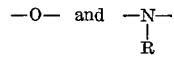

Q is a divalent radical having 1 to 22 carbon atoms that is bonded through carbon atoms to both Y' and T, T is a silicon containing radical selected from the class consisting of

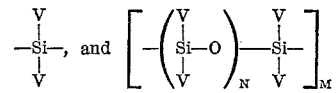

where N is 1 to 28 and M is 1, R is a radical selected from the class consisting of hydrogen and hydrocarbon containing radicals containing 1 to 22 carbon atoms, V is selected from the class of consisting of —OR, —SR and R; Si' is a silicon atom of the silicic base, and in which the silicon containing radicals are crosslinked through an

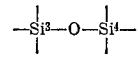

linkage where $Si^3$ and $Si^4$ are silicon atoms in different T radicals to form a network.
2. The composite of claim 1 in which the alpha-olefin units are ethylene units.

References Cited

UNITED STATES PATENTS 3,249,461   5/1966   Te Grotenhuis ____ 117—126 X
3,252,825   5/1966   Marzocchi et al. _____ 117—126

RALPH S. KENDALL, Primary Examiner.

THOMAS E. BOKAN, Assistant Examiner.

U.S. Cl. X.R.

117—123, 161; 260—827